(12) United States Patent
Piccuezzu et al.

(10) Patent No.: US 7,250,947 B2
(45) Date of Patent: Jul. 31, 2007

(54) METHOD AND DEVICE FOR CONSTRUCTING AND VIEWING A COMPUTER MODEL IMAGE

(75) Inventors: Eric Piccuezzu, Nice (FR); James Dugalais, Antibes (FR)

(73) Assignee: Seemage (SAS), Biot (FR)

( * ) Notice: Subject to any disclaimer, the term of this patent is extended or adjusted under 35 U.S.C. 154(b) by 104 days.

(21) Appl. No.: 10/532,305

(22) PCT Filed: Oct. 22, 2003

(86) PCT No.: PCT/FR03/50102

§ 371 (c)(1),
(2), (4) Date: Apr. 22, 2005

(87) PCT Pub. No.: WO2004/038576

PCT Pub. Date: May 6, 2004

(65) Prior Publication Data

US 2006/0103669 A1    May 18, 2006

(30) Foreign Application Priority Data

Oct. 22, 2002 (FR) .................................. 02 13118

(51) Int. Cl.
    *G06T 15/40* (2006.01)
(52) U.S. Cl. ..................................... 345/421
(58) Field of Classification Search ............. None
    See application file for complete search history.

(56) References Cited

U.S. PATENT DOCUMENTS

| | | | |
|---|---|---|---|
| 5,377,314 A | | 12/1994 | Watts et al. |
| 5,729,704 A | * | 3/1998 | Stone et al. ................ 715/804 |
| 5,754,348 A | * | 5/1998 | Soohoo ..................... 359/802 |
| 5,815,150 A | | 9/1998 | Shimizu |
| 5,818,455 A | * | 10/1998 | Stone et al. ................ 345/619 |
| 5,861,885 A | | 1/1999 | Strasnick et al. |
| 6,249,290 B1 | * | 6/2001 | Herndon et al. ........... 345/660 |
| 6,377,285 B1 | * | 4/2002 | Doan et al. ................. 715/764 |
| 6,396,507 B1 | * | 5/2002 | Kaizuka et al. ............ 345/661 |
| 6,518,986 B1 | * | 2/2003 | Mugura ..................... 715/810 |
| 6,526,577 B1 | * | 2/2003 | Knudson et al. ............ 725/40 |
| 6,664,959 B2 | * | 12/2003 | Duluk et al. ................ 345/422 |
| 6,933,955 B2 | * | 8/2005 | Crocitti et al. ............. 345/666 |
| 6,958,759 B2 | * | 10/2005 | Safadi et al. .............. 345/660 |
| 6,985,161 B1 | * | 1/2006 | Politis ....................... 345/629 |

OTHER PUBLICATIONS

Marschallinger: "A Voxel Visualization and Analysis System Based on Autocad" Computers and Geosciences, Pergamon Press, Oxford, GB, vol. 22, No. 4, May 1996, pp. 379-386, XP002182016 ISSN: 0098-3004.

\* cited by examiner

*Primary Examiner*—Mark Zimmerman
*Assistant Examiner*—Enrique L. Santiago
(74) *Attorney, Agent, or Firm*—Young & Thompson (57) ABSTRACT

The invention relates to a method and a device for constructing and viewing a computer model image. The invention comprises the following steps: at least one zone of the image is selected; the part of the image that is located outside the selected zone (2) is displayed with standard display attributes; specific display attributes are defined for the objects to be displayed in the selected zone (2); and the part of the image that is located inside the selected zone (2) is displayed with the specific display attributes.

19 Claims, 9 Drawing Sheets

METHOD AND DEVICE FOR CONSTRUCTING AND VIEWING A COMPUTER MODEL IMAGE

The invention relates to a method and a device for constructing and viewing computer model image.

The invention will find its application in any field relating to the viewing of three dimensional models. In particular, the viewing method may be integrated in any display system connected to three dimensional computer-aided design software (based in particular on the OpenGL® library, or other) to improve the productivity on complex modeling work. It will also apply to the exploration and discovery of complex 3D models, as well as presentations, detailed views, in particular linked to Web pages.

The invention also allows to achieve viewing of 3D radiographic models and will also apply to medical imagery.

Generally, the field of application of the device and the method subject of this invention is that of three dimensional viewing models.

In this field, a distinction is made between opacity and visibility criteria. Opacity defines a degree of transparency of the object present on the model, whereas visibility is a Boolean state (either visible, or invisible). The criteria of opacity and visibility are complementary attributes of the object.

Currently, many three dimensional viewing solutions use the fourth component (usually called Alpha) associated with the three traditional channels defining the image (red, green, and blue channels). The Alpha component is supported by all the real-time 3D programming interface applications currently used, and in particular under OpenGL®.

According to the state of the technique, the opacity attribute has to be defined by the user. This designates one or more objects in the computer model and assigns an opacity value to them. In the remainder of this description, the term opacity will be used while bearing in mind that the notion of transparency could be employed. Visibility is also often managed using overlays; the user navigates to isolate such or such a type of object to be displayed.

The solutions set up today for assigning visibility and opacity have many disadvantages.

Initially, it is very hard to judiciously assign relevant transparencies to many objects.

Moreover, there is no fast and intuitive tool for quickly modifying visibility attributes in order to access the internal parts hidden within the model, especially when they are complex models.

According to current techniques, opacity and the visibility are not, moreover, dependent on the position of the observer.

It becomes difficult to interpret the model when many objects are transparent, and neither is it possible to limit these opacity and visibility attributes to certain portions of the screen.

The present invention makes it possible to overcome one or more disadvantages of the techniques known until now.

It allows fast and effective modification of certain display parameters of the objects constituting the model and does so in one or more delimited zones of the screen in order to improve the visibility of the objects or to develop a particular presentation required by the user.

In particular, the invention allows the creation of a zone of influence in the screen with a specific rendering based on attributes defined by the user.

The dimensions of this zone vary from a very small part of the screen to the entire screen.

In a preferred method, the specific rendering is achieved by assigning the opacities and the visibility of the objects present in the zone considered based on a function of the distance between the object in question and the camera, or the viewpoint too.

The viewing attributes are thus calculated automatically and do not definitively replace the attributes defined by the user, and this makes it possible to retain the integrity of the model and of its initial display attributes.

Another advantage of the invention is that it allows, in a preferred method, to choose the function for the desired distance between the object and the camera in order to modify the rendering in the selected zone.

Other parameters can be controlled, and this by means of a man-machine interface.

By varying these parameters and the type of function, the user can view at will the objects of the model at the desired depth. By depth is meant the minimum distance of an object to the screen.

The context of the model is still retained and the device proposed here can be limited advantageously to one or more circular zones of the screen which can be moved at leisure. This zone of influence can be set so that it is possible to work with conventional computer-aided design tools. For example, completely transparent or invisible objects in the zone of influence cannot be selected.

This device also enables newly defined attributes to be locked so that they are retained during the subsequent modifications of the camera. The device is also advantageously equipped with a "following mode", in which the zone of influence in two dimensions follows the locked objects when the camera position is modified.

Other uses and advantages will appear during the description which follows, which presents a preferred embodiment of the invention which is not restrictive.

The present invention relates to a method for constructing and viewing computer model image, comprising the following stages:

defining and applying display attributes for the objects comprising the model, storing the aforementioned attributes in a memory, displaying the image on a viewing screen, The following actions are performed:

selection of at least one image zone, display of the part of the image located outside the selected zone with the current display attributes, definition of the specific display attributes for the objects to be displayed inside the selected zone, display of the part of the image located in the selected zone (2) with the specific display attributes.

Advantageously, this method is such that:

The image located outside of selected zone is displayed by creation of a mask corresponding to the aforementioned selected zone The specific display attributes are defined by application of a function (f) of the distance between the object to be displayed and the screen plane.

The objects for which the value of function (f) is less than a predefined threshold are deleted from the list of the objects to be displayed.

The defined specific display attributes are stored for maintaining their application to the objects to be displayed even after modification from the image viewpoint.

The display attributes include an opacity value.

The display attributes include a Boolean visibility value.

The list of the objects to display is determined by selecting the objects of the model projected in the selected zone.

The selection of the objects to be displayed is refined by deleting the objects less than a predetermined distance from the screen plane.

The current display attributes are stored before definition of the specific display attributes for later use.

The Selected zone is linked to the objects to be displayed so that they still correspond whatever the changes of the viewpoint position.

The selection of the image zone is modified by moving the zone.

The selection of the image zone is modified by changing the dimension of zone.

The selection of the image zone is modified by changing the position of the screen plane.

The selection of the image zone is modified by moving the computer model in the screen plane.

The present invention also relates to a device for constructing and viewing a computer model image including:
means for defining and applying the display attributes of the objects constituting the model,
a memory capacity for data storage,
a screen for viewing and means for displaying the image on aforementioned screen, It also includes a man-machine interface with means for selecting at least one zone of the image and means for data input of at least one parameter for defining the specific display attributes for the objects to be displayed in selected zone, for displaying the part of the image located outside selected zone with the current display attributes, and displaying the part of the image located inside selected zone with the specific display attributes.

According to the preferred embodiments introduced below, the device may take the following forms:

The means for data input comprise means for selecting a function of the distance between the object to be displayed and the screen plane of the image to be applied for the definition of the specific display attributes.

The means of data input comprise means for inputting a threshold value in order to delete from the list of objects to be displayed those for which the value of the function is less than the said threshold.

The selection zone is a disc.

The man-machine interface includes means for adjusting the radius of the selection zone.

It includes means for the local processing of objects illumination.

The drawings attached are given as examples of the invention and are not restrictive. They represent only one embodiment of the invention and will make it possible to understand it easily.

Figure 1:
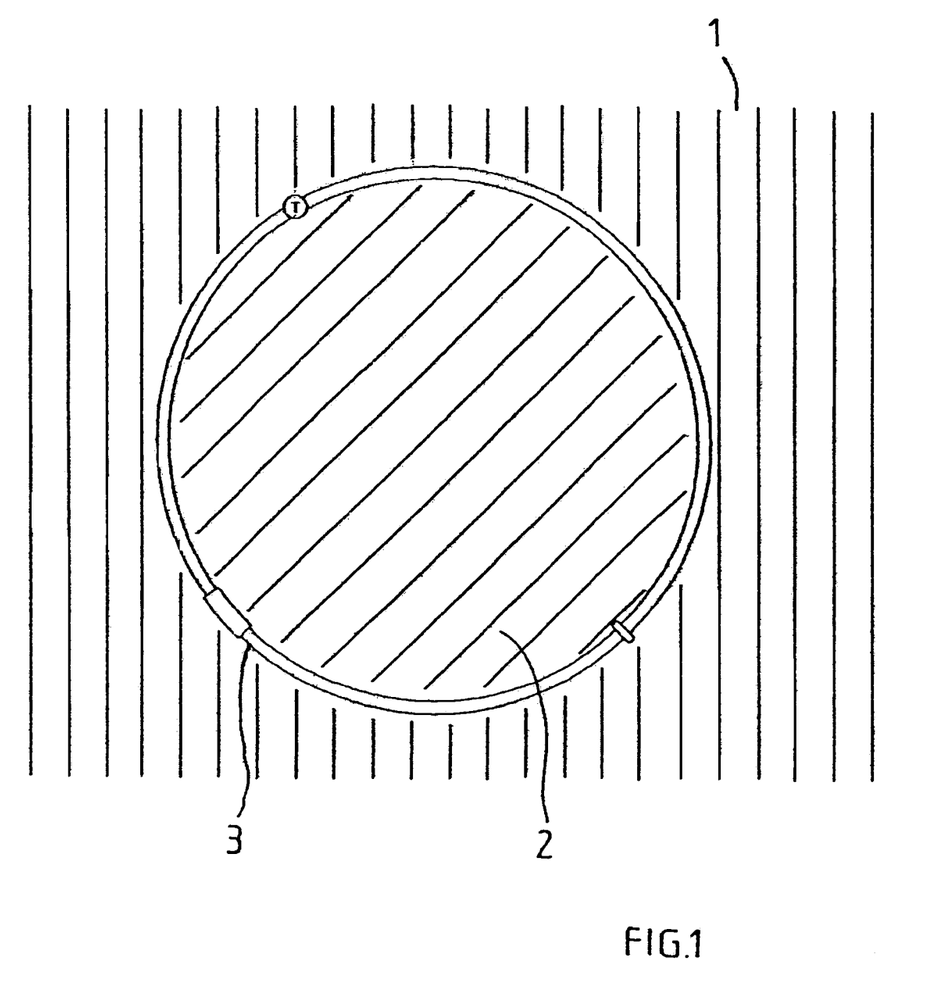
FIG. 1 illustrates the formation of a selection zone with a specific display rendering relative to the remainder of 2D zone on the screen.

By reference to FIG. 1, the man-machine interface device 3 allows a zone 2 in the area constituted by the screen 1 to be selected. In this example, Zone 2 is in the form of a disc and defined by a circular contour 4. Of course, this configuration is not restrictive for the present invention. In addition, several zones 2 can be created on screen 1. Moreover, zone 2 may occupy all the screen. The selection made is then a total selection of the contents of the model that can be displayed on the screen.

Screen 1 is used to display the image of a computer model for which an example is given on FIGS. 3 to 9 in the form of a vehicle wheel 8. A computer model consists of several objects defined geometrically by any computer-aided design means, and in particular using meshing.

In the case of wheel 8, given as an example, various objects such as tire 9, spokes 10, hub 11, and rim 12.

For the description which follows, but on a non-restrictive basis, the display attributes considered are created by the opacity and the Boolean parameter of object visibility. Moreover, by object to be displayed is meant an object which is at least partly inside selected zone 2. The objects to be displayed can be determined by the technique of bounding volumes or by any other technique. Additional sorting can be applied, for instance according to the type of object.

According to the invention, the first step is to select at least one zone in the image. With this in mind, the man-machine interface 3 is used and allows the selection of a zone 2 with circular contour according to the example in the figures.

In particular, the selection can take place:
1—by moving or modifying the size or the shape of selection zone 12,
2—by moving the scene relative to the screen,
3—by changing the position of the screen plane.

The part of the image located outside selected zone 2 is then displayed and this by application of the current display attributes, i.e. preset in the initial context of model definition. To selectively display this part of the image and not the part located in zone 2, a mask, whose definition is stored in a buffer memory of the type "stencil buffer", is used.

As to aforementioned zone 2, the specific display attributes of the objects to be displayed are defined.

Of course the list of the objects affected by this specific display are first displayed.

A definition of the display attributes relating to in particular opacity and the visibility can then be assigned to them.

More precisely, this definition of the specific display attributes takes place by application of a function $f$, function of the distance between the object to be displayed and the screen plane. As an example, a function $f$ can be used for a rendering of the onion skin type in which only objects with depth greater than a predetermined threshold are visualized.

Moreover, a function of the x-ray type can be used. In this case the objects are assigned an attribute of opacity which is function of their depth and a value fixed by a cursor 7.

According to another example, function $f$ executes a sectional plane, which is parallel to the viewing plane, and which is moved forward or backwards by a depth adjustment using cursor 7.

Once the specific display attributes have been defined, the part of the image located in selected zone 2 with these attributes is displayed.

Below is a more detailed example of the various stages that may be implemented according to the invention, and this by the use of known techniques involving:

a buffer memory of depth (Z) usually called Z buffer. The use of the Z buffer technique allows rendering of the hidden faces through a memory capacity of the buffer type with the dimensions of the image in two dimensions. On projection of the model-defining polygons, the pixel is replaced only if the preceding memorized Z (depth value) is more than the current Z of the tested pixel. This depth test procedure is usually called the depth-test.

Stencil buffer: this is a memory of the buffer type often used by program application interfaces for three-dimensional modeling and making it possible to mask certain portions of the image similar to the use of a stencil in traditional drawing.

Alpha blending: this is a display component used as an additional element to the three conventional color channels (red, green, blue) and which can be used to assign an opacity value to the objects.

Screen Plane (also called "near clipping plane"): the screen plan is the "virtual" plane on which the objects constituting the 3D scene are projected to create the image. This projection can be in perspective or orthographical. The image is limited to a finished surface of this plane, generally rectangular. This plane is oriented and only the objects positioned all or partly beyond this plane and projected all or partly in the finished surface are visible. The position of this plane is related to the camera.

According to the example of the use of these parameters, the following stages for the execution of the invention will be used:

1. Saving of the initial context of the model:
    Saving of the states inherent in the Z buffer,
    Saving of the states inherent in the Alpha blending,
    These are preparatory stages for defining zone 2, selected while retaining the initial modeling context.
2. Preparation of selected zone 2:
    Activation of the stencil buffer.
    Initialization of the stencil buffer with a nil mask value,
    Inactivation of the Z buffer,
    Deactivation of the depth-test function,
    Deactivation of the data writing in the color-buffer (buffer memory used for the color definition),
    Drawing of the zones in two dimensions for selection by the user operating the man-machine interface device 3 and stored in the stencil buffer with a non-nil mask value,
    Reactivation of data writing in the color-buffer.

In this phase, selected zone 2 has been prepared as well as the stencil buffer.

3. First phase with the current display attributes:
    Restoration of the current states of Z Buffer,
    Creation of the first master key on screen 1 consisting in drawing the scene completely by modifying only the zones of the screen 1 where the mask value is nil (entirety of the screen except the selected zones 2).

On exit from this first phase, the image of the model with the display attributes of the initial context are obtained, except for selected zone 2.

4. Formation of selected zone 2:
    Determination of list L of objects to be displayed in selected zone 2 per extraction of the objects projecting into this zone 2. Any object located entirely or partly in zone 2 is then retained.

To execute a fast projection calculation, the technique of bounding volumes consisting in framing each object in a right-angled parallelogram and using the values of this parallelogram to calculate the projection can be used,
    Sorting of the list of the objects L obtained according to their minimum distance from the camera, is:
From the nearest to the farthest away in the case of an onion skin rendering,
From the farthest away to the nearest in the case to a radiographic rendering
    Saving of the display attributes (in particular the opacity) from list L,
    Modification of all the display attributes (in particular the opacity) of the objects in list L following a predetermined calculation. More precisely, this calculation uses a function $f$ of the distance between the display object and the camera. As previously described, this function allows in particular the creation of the onion skin, x-ray or sectional plane rendering.
    Deactivation of Z buffer writing,
    Deactivation of the depth-test,
    Activation of Alpha blending,
    Second display pass. This phase consists in drawing the portion of the image contained in selected zone 2. To do this, the list of sequenced objects L (in the sequence indicated previously) is drawn by modifying only the screen zone in which the mask is defined (i.e. not nil),
    Restoration of the opacity attributes of list L.

Following this stage, complete rendering of the scene is obtained with, in selected zone 2, the specific opacity attributes corresponding to the wishes of the user, in particular by selection of the function $f$.

5. Reinitializing the parameters:
    Deactivation of the Stencil buffer,
    Restoration of the states saved on saving the initial context (stage 1) inherent in the Z buffer,
    Restoration of the states saved on saving the initial context (stage 1) inherent in Alpha blending.

On completion of this stage, the system is repositioned in an initial context. Thus, it will be noted that the use of the invention does not disturb the normal operation of the modeling and display system used.

According to a variant, it is possible to use a function $f$ so that are deleted from list L the objects to be displayed those for which the value of the function $f$ is less than a predetermined value defined by the user. In particular, it may consist of a minimum value for the distance to the camera. In this case, the sorting of the objects takes place from the closest to the farthest away.

Moreover, it will be noted that specific illuminations or renderings can be assigned to selected zone 2. Therefore the display attributes also extend to illumination values (according to position and light intensity parameters).

FIGS. 1 to 9 show an embodiment of the invention applied to the display of a wheel 8.

Figure 2:
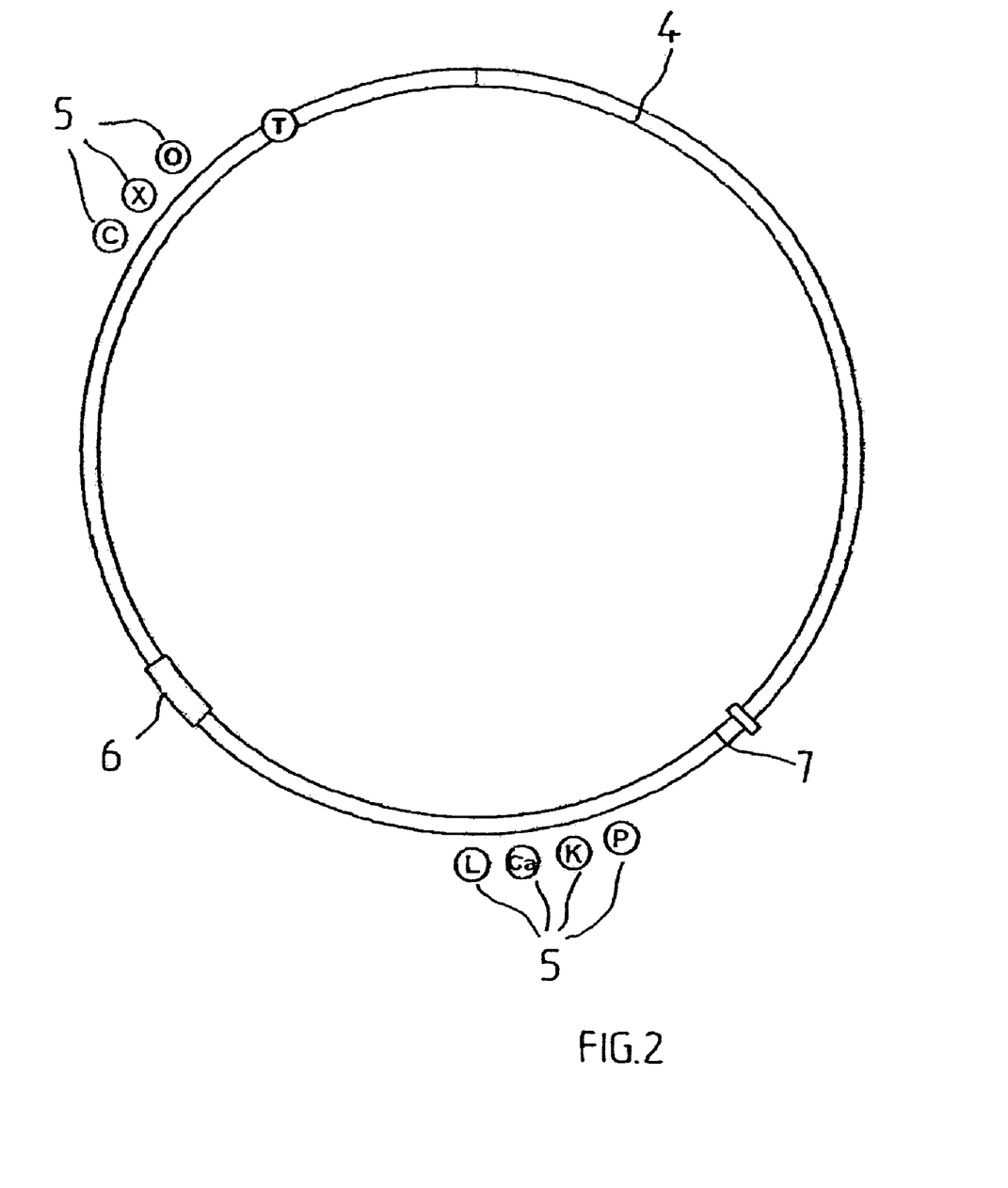
FIG. 2 more precisely shows an example of one embodiment of the man-machine interface for the system, and the formation of a circular selection zone.

As shown on FIG. 2, the device consists of a man-machine interface 3 including multiple buttons 5 used for the various controls and functions. The buttons are located on the circumference of contour 4 defining selected zone 2. This may be buttons 5 for selecting the function for defining specific display attributes. For instance, these buttons are located in the upper left of contour 4.

In addition, other buttons can be used, such as those shown in the lower part of FIG. 2. These buttons can be used for other functions such as local modification of illumination, execution of a screenshot, or locking of the viewing parameters.

There are other functions on the man-machine interface device 3 shown.

This consists of a button or a handle 6 for changing the radius and therefore the size of the selected zone 2 as required. Contour 4 can thus be increased or decreased using the mouse arrow on this zone of button 6. Any movement of the disc involves a real time update of the display. This update is also carried out when the user alters the position of the view by modifying the camera.

A cursor 7 is present on contour 4. Its movement allows the depth threshold from which the object is displayed to be modified. Any threshold shift using cursor 7 leads to a real time update of the display. Cursor 7 is thus used to change the value of the predetermined threshold parameter for function f.

It is also possible to change the position of selected zone 2 by positioning the mouse arrow on the contour 4 and moving it.

Figure 3:
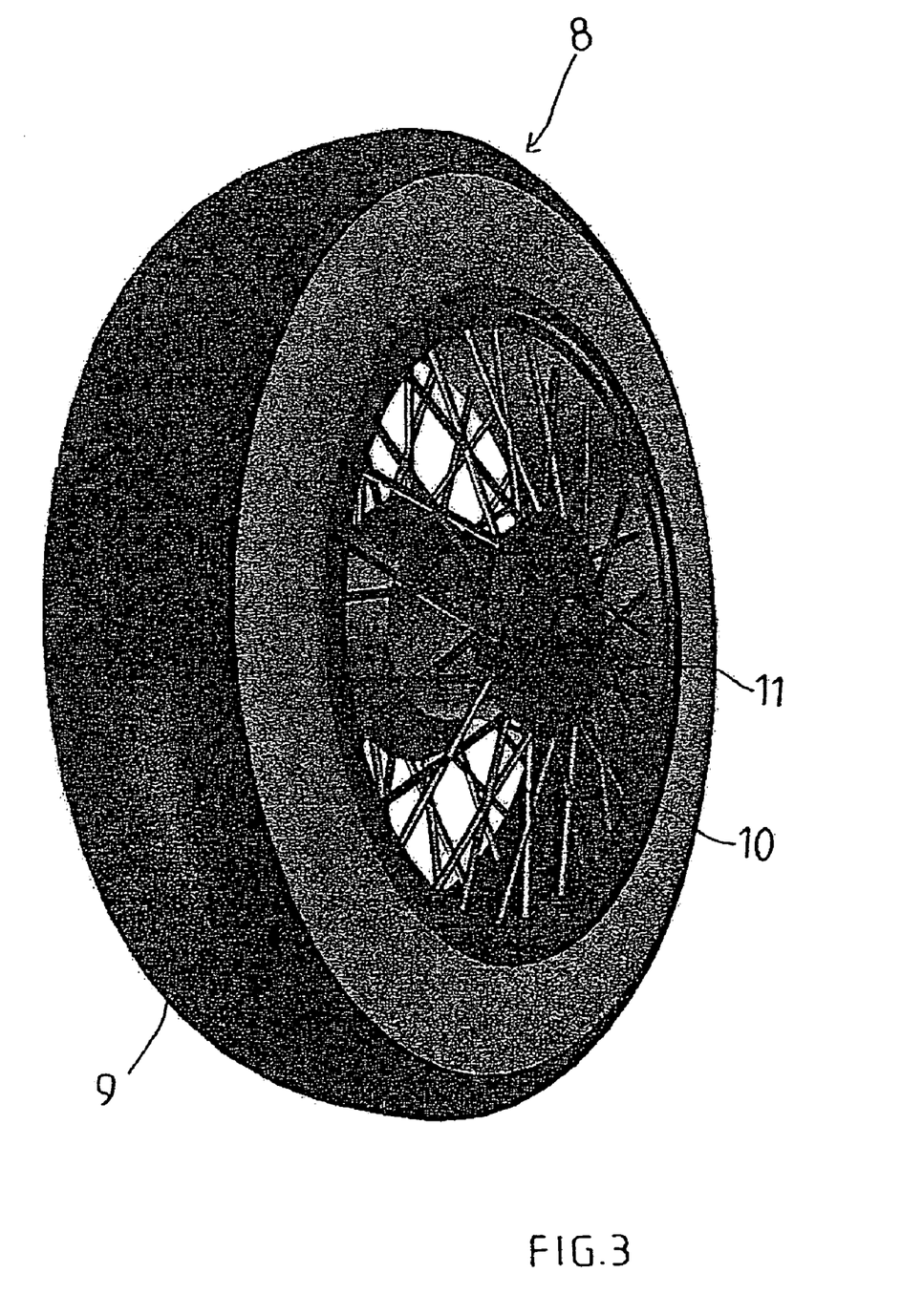
FIG. 3 is a first view of an example of the invention's application used to view a vehicle wheel.
Figure 4:
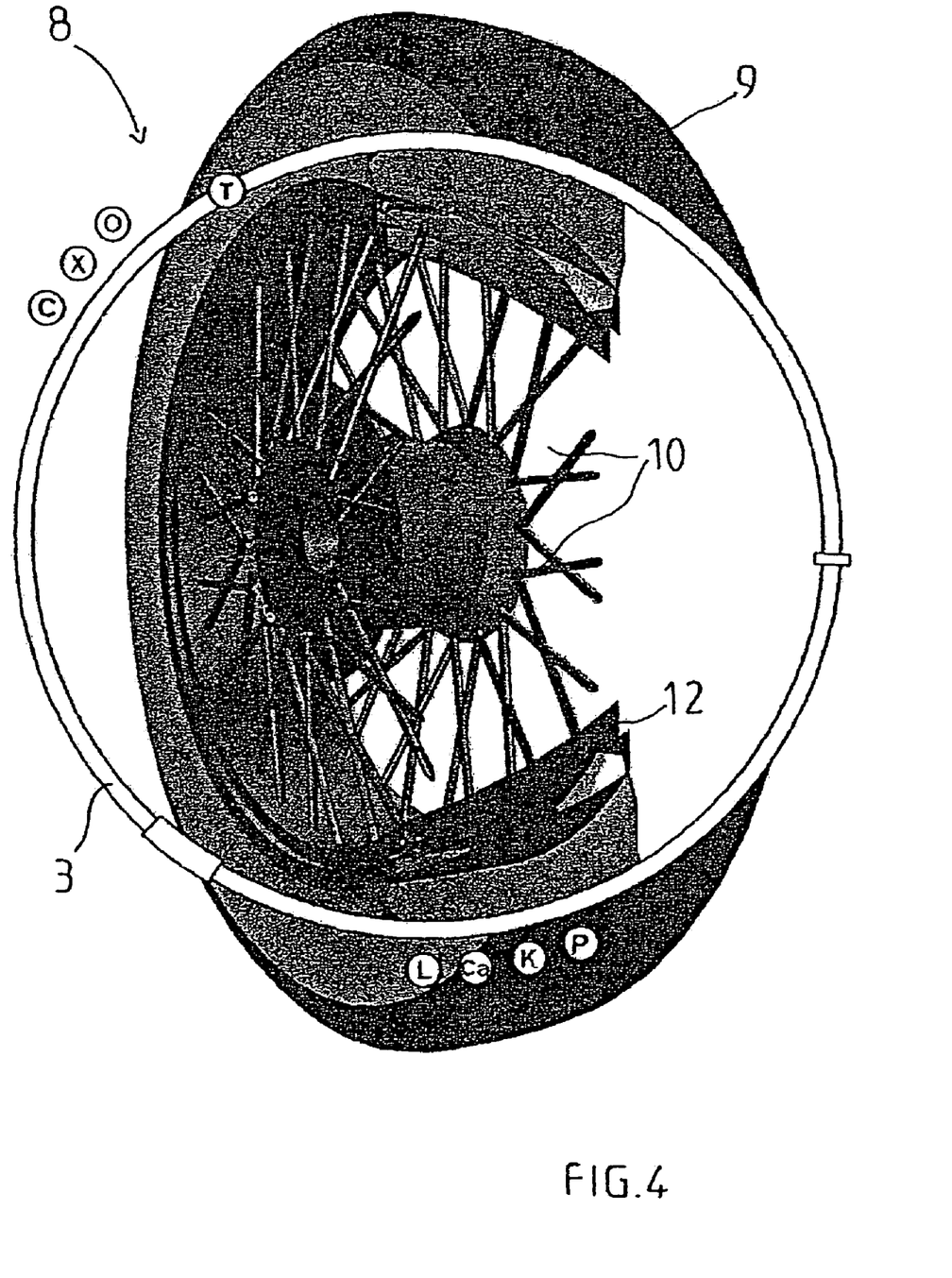
FIG. 4 illustrates this model of the wheel, with the creation of a selection zone and a specific display of the sectional plane type.

FIG. 4 shows a first example of the invention device applied to wheel 8 as shown on FIG. 3.

In FIG. 4, a plan view is obtained by positioning cursor 7 at a predetermined level defining the depth of the sectional plane. The various objects constituting the model are thus shown here in sectional view.

Figure 5:
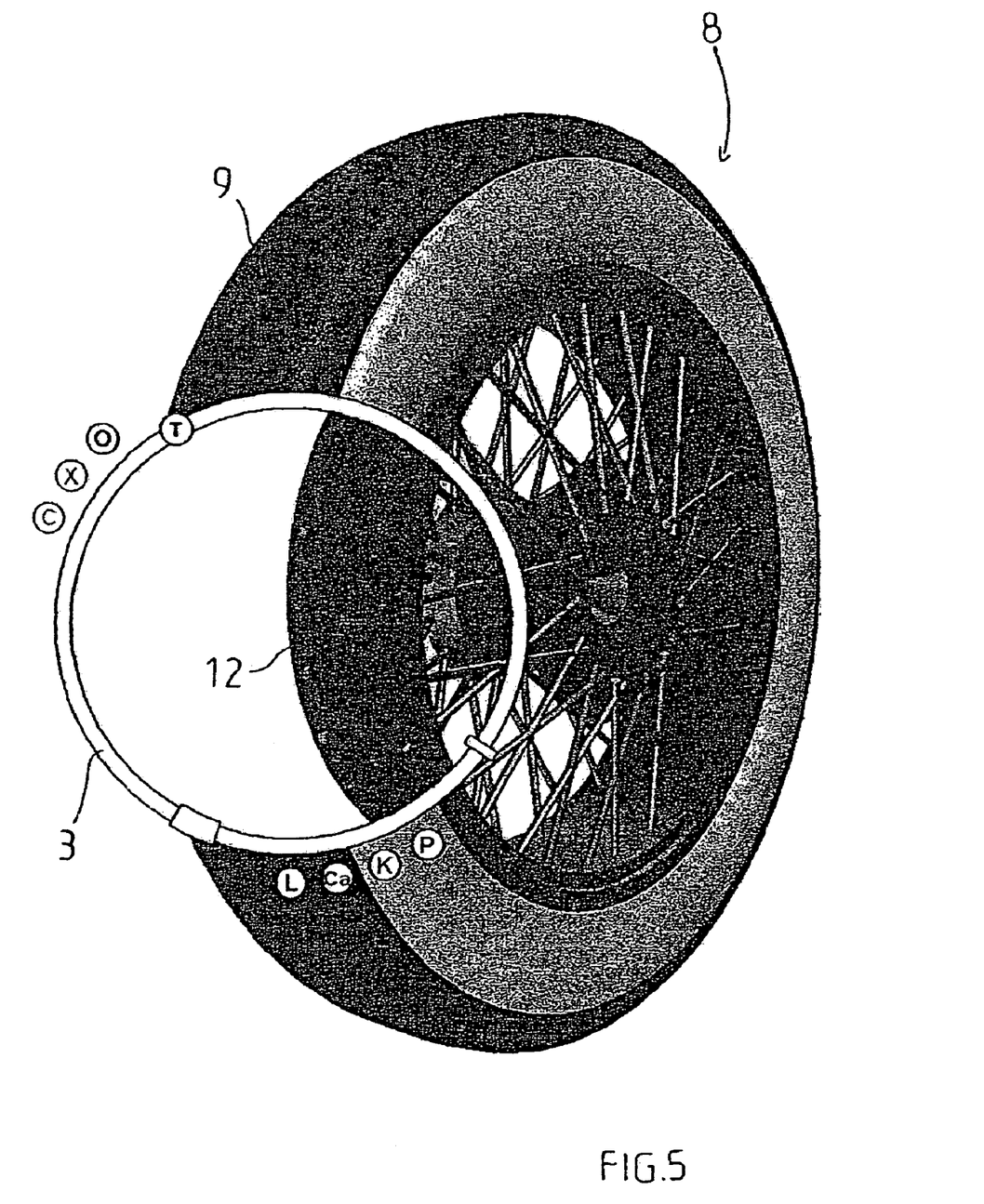
FIG. 5 shows another possibility of display on the basis of the model in FIG. 3, with an onion skin type rendering. "Onion skin" is used to describe the system for quickly exploring a model by removing on request its objects in successive layers based on their minimum distance from the screen plane (depth or "Z").

In FIG. 5, a function of the onion skin type has been applied in order to only display the portion hidden by tire 9 in selected zone 2.

Figure 6:
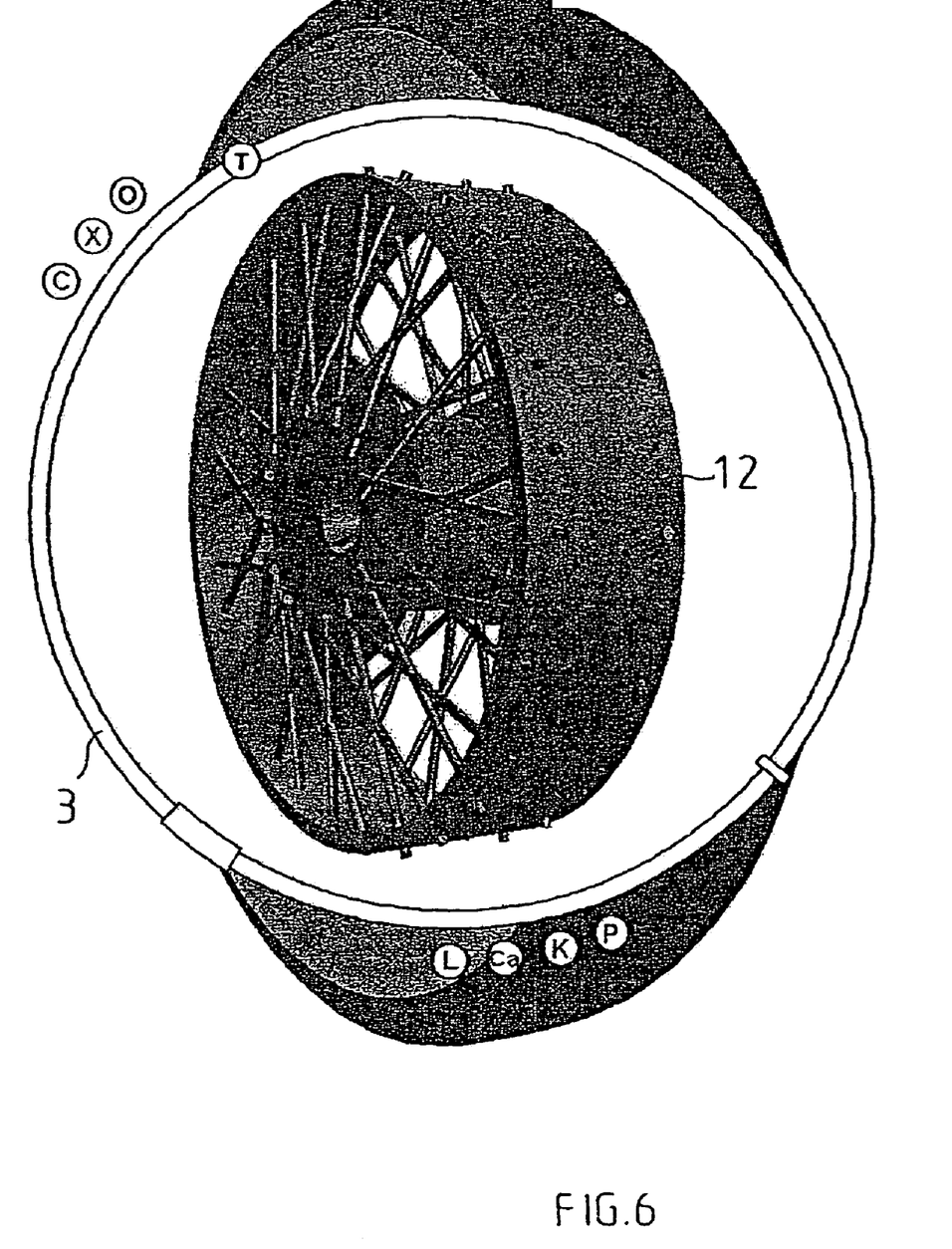
FIG. 6 shows another rendering possibility of the device of the invention applied to the model in FIG. 3 with an onion skin function.

FIG. 6 shows another view using the onion skin function in a selection zone 2 increased by means of button 6.

Figure 7:
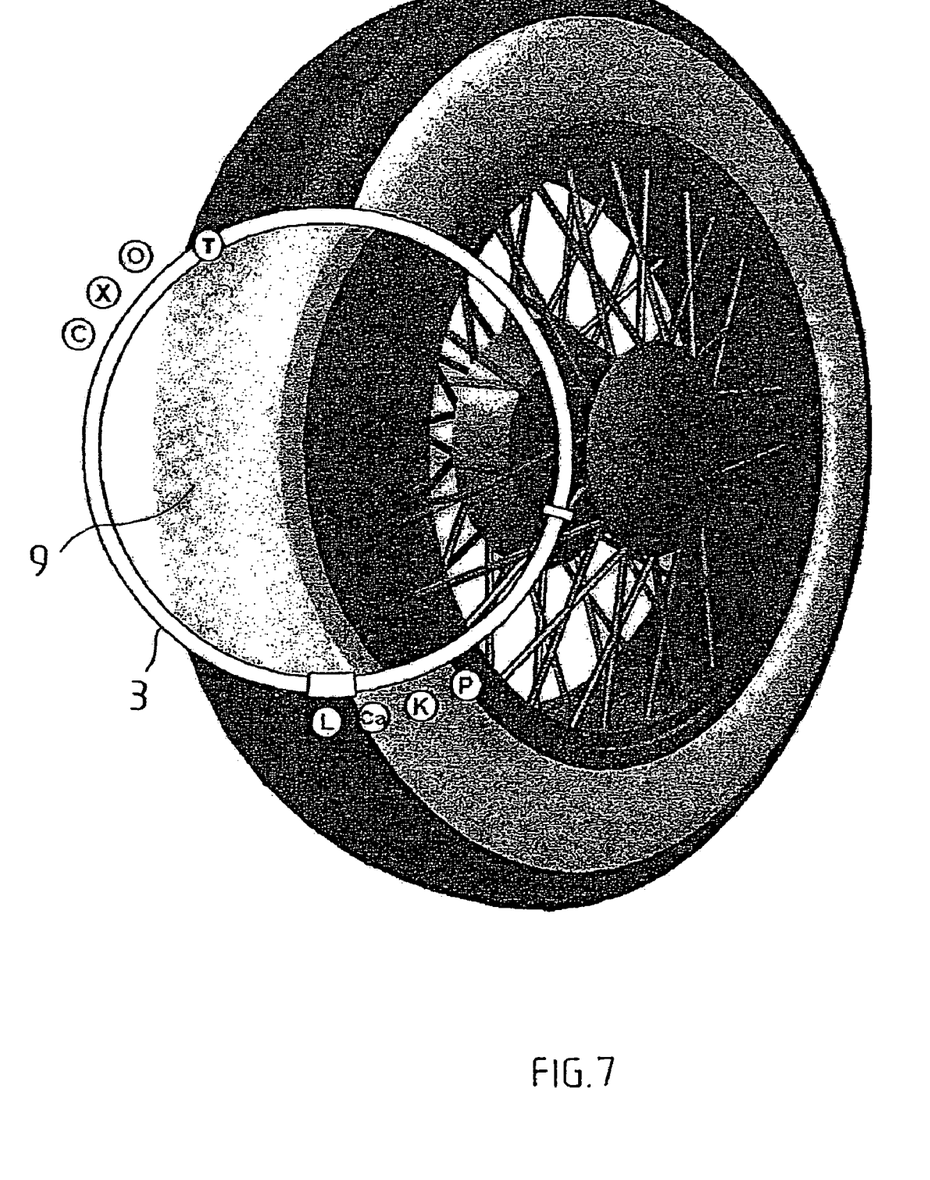
FIGS. 7 and 9 are examples of radiographic-type rendering, in which the objects are assigned an opacity attribute according to the depth and of a value set by the user. In the remainder of the description, x-ray is used for this type of visual rendering comparable to that obtained by means of medical imagery, but using however different methods.

FIG. 7 shows another function example, in this case consisting of a radiographic function, changing the opacity of the objects according to their depth.

This function allows all the objects situated in the selection zone to be displayed and their in-depth positioning to be understood.

Figure 8:
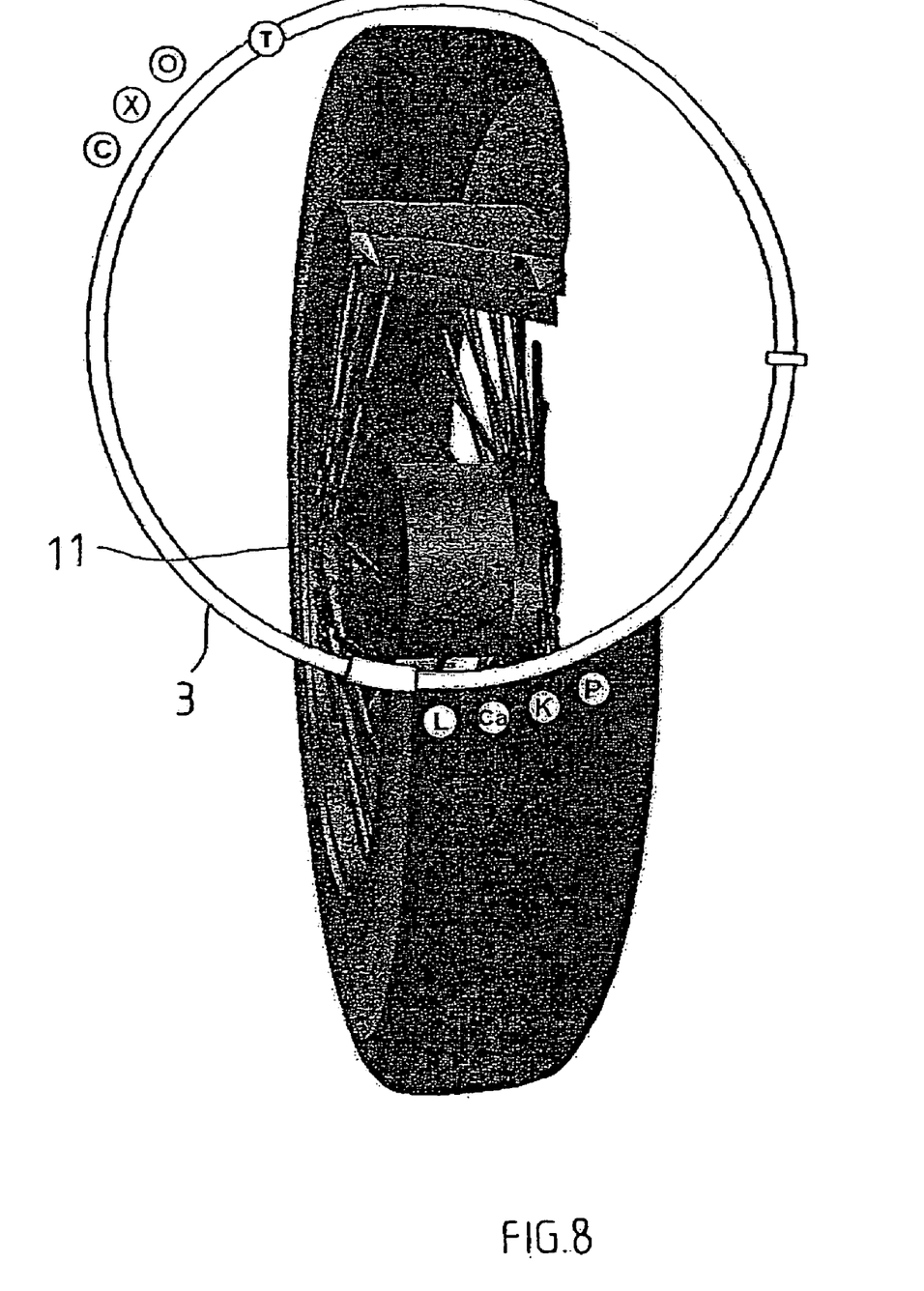
FIG. 8 shows another example according to another orientation and another sectional plane.

FIG. 8 shows another example of the sectional view with a position of cursor 7 modified relative to FIG. 4.

Figure 9:
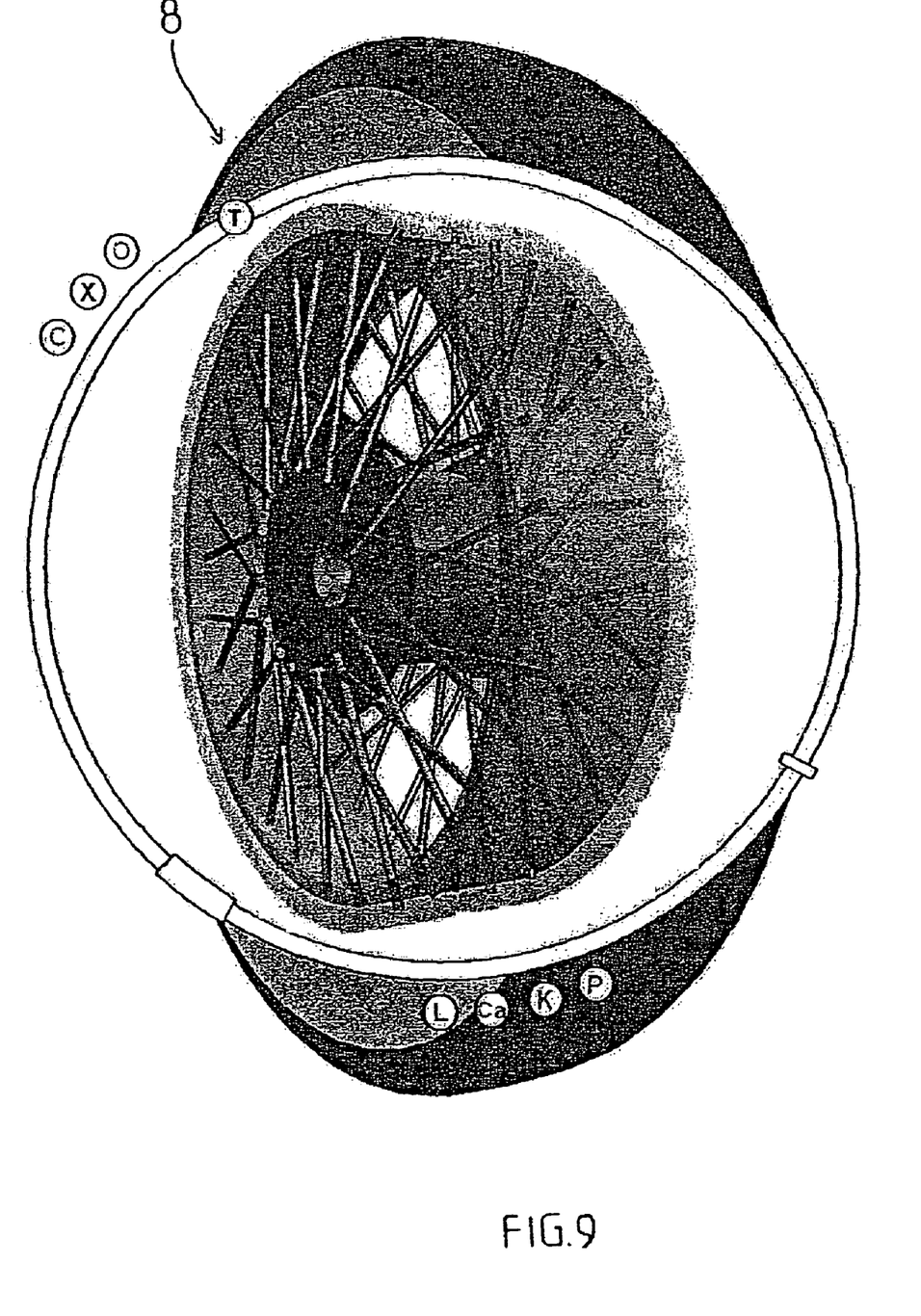

Last of all, FIG. 9 shows another viewing possibility using the radiographic function, wheel 8 being shown in this case from the front.

Of course, the man-machine interface device will be able to integrate the current functions, such as a WYSIWYG interface (What You See Is What You Get) consisting of previewing the proposed operations when the pointer approaches a control button 5. This facilitates the interactions of the user with the on-board software.

The function considered is highlighted.

REFERENCES 1. screen
2. selected zone
3. man-machine interface device
4. contour
5. button
6. radius change button
7. cursor
8. wheel
9. tire
10. spokes
11. hub
12. rim
T Toolbox
O Onion skin function
X X-ray function
C Sectional plane function
L Illumination function
Ca Camera
K key for attribute locking
P Parameters

The invention claimed is:

1. Method for constructing and viewing computer model image, comprising the following steps:
    defining and applying display attributes for the objects comprising the model,
    storing the aforementioned attributes in a memory,
    displaying the image on a viewing screen (1),
    selecting at least one image zone,
    displaying the part of the image located outside the selected zone (2) with the current display attributes,
    defining the specific display attributes for the objects to be displayed inside the selected zone (2) by application of a function (f) of the distance between the object to be displayed and the screen plane, and
    displaying the part of the image located in the selected zone (2) with the specific display attributes.

2. Method according to claim 1, wherein the objects for which The value of function (f) is less than a predefined threshold are deleted from the list of the objects to be displayed.

3. Method according to claim 1, wherein the defined specific display attributes are stored for maintaining their application to the objects to be displayed even after modification from the image viewpoint.

4. Method according to claim 1, wherein the display attributes include an opacity value.

5. Method according to claim 1, wherein the display attributes include a Boolean visibility value.

6. Method according to claim 1, wherein the list of the objects to display is determined by selecting the objects of the model projected in said selected zone (2).

7. Method according to claim 6, wherein the selection of the objects to be displayed is refined by deleting the objects less than a predetermined distance from the screen plane.

8. Method according to claim 1, wherein the current display attributes are stored before definition of the specific display attributes for later use.

9. Method according to claim 1, wherein the selected zone (2) is linked to the objects to be displayed so that they still correspond whatever the changes of the viewpoint position.

10. Method according to claim 1, wherein the selection of the image zone is modified by moving said selected zone (2).

11. Method according to claim 1, wherein the selection of the image zone is modified by changing the dimension of said selected zone (2).

12. Method according to claim 1, wherein the selection of the image zone is modified by changing the position of the screen plane.

13. Method according to claim 1, wherein the selection of the image zone is modified by moving the computer model in the screen plane.

14. Device for constructing and viewing a computer model image, comprising:
- means for defining and applying the display attributes of the objects constituting the model, a memory capacity for data storage,
- a screen (1) for viewing and means for displaying the image on said screen (1), a man-machine interface (3) with means for selecting at least one zone of the image and means for data input of at least one parameter fro defining the specific display attributes for the objects to be displayed in said selected zone (2), said means for data input comprising means for selecting a function (f) of the distance between the object to be displayed and the screen plane of the image to be applied for the definition of the specific display attributes, for displaying the part of the image located outside said selected zone (2) with the current display attributes, and for displaying the part of the image located inside said selected zone (2) with the specific display attributes.

15. Device according to claim 14, wherein the means of data input comprise means for inputting a threshold value in order to delete from the list of objects to be displayed those for which the value of the function (f) is less than the said threshold.

16. Device according to claim 14, wherein the selection zone is a disc.

17. Device according to claim 16, wherein the man-machine interface (3) includes means for adjusting the radius of the selection zone.

18. Device according to claim 14, wherein it includes means for the local processing of objects illumination.

19. Device according to claim 14, wherein the means for data input are located on the circumference of the contour of said selected zone.

* * * * *